Patented May 15, 1928.

1,669,840

UNITED STATES PATENT OFFICE.

FRIEDRICH POLITZ, OF BRESLAU, GERMANY.

POWDER FOR WELDING CASTINGS, PARTICULARLY OF GRAY CAST IRON.

No Drawing. Application filed September 4, 1926, Serial No. 133,733, and in Germany October 21, 1925.

It is well-known that when gray cast iron is welded at a relatively low temperature, there will be a very material separation of carbon as iron carbide or cementite ($Fe_3C$) at the weld upon cooling, the material at the welded seam thus becoming so hard as to be practically unworkable. According to my present invention, this difficulty is overcome by adding a reagent, such as for instance iron suboxide (FeO), which promotes the separation of carbon as graphite and thus prevents any abundant formation of cementite. The addition of iron suboxide or equivalent agent such as the suboxides of other metals of the iron group to the iron which has been liquefied at the welding point by the direct action of a welding burner, therefore prevents the carbon at the welding seam from forming cementite my combining with the iron, but causes the carbon to become separated as graphite, thereby producing at the welding point an iron-carbon alloy corresponding to the composition of the cast iron, which alloy is susceptible of being worked in the same manner as gray cast iron.

The simplest way of carrying out the welding operation consists in adding the iron suboxide or its equivalent to the welding powder which in connection with the welding operation is applied to the iron parts to be connected, for the purpose of removing impurities.

Practical trials have shown that castings welded according to this new invention are just as strong at the weld as at other points. The process may be employed for repairing injured castings or parts of machinery which hitherto had no value except as scrap, and is also available for the manufacture of such parts of machinery as can not be cast in one piece on account of cracking readily when cooled after casting or on account of containing bubbles or cracks which do not become apparent until the machining or other working of the casting. Machine parts of this character can be made according to my new method, by welding together a number of individual smaller castings.

I am aware of the fact that metal oxides, and particularly suboxide of iron or of copper, have been used as additions to the soldering agent in the hard soldering of two cast iron parts or of a cast iron piece with some other metallic part. This prior process, which is performed at the incandescence temperature of the metal parts to be joined, is based on the decarbonizing action of the metal oxides added to the hard solder, upon the edges of the metal parts to be soldered together, the suboxide of copper or of iron, for instance, being reduced by the carbon, at the soldered joint, to metallic copper or iron respectively, such carbon being consumed and the metal edges, freed of carbon, becoming somewhat porous so as to better absorb or take the solder.

In my new process, however, the iron suboxide or its equivalent which is added to the liquefied iron at the weld functions only as a catalyst, its presence promoting the separation of carbon in the form of graphite during the cooling of the alloy produced by melting at the weld, such iron suboxide or equivalent however, not entering into chemical combination with the carbon.

My new welding process offers material technical and industrial advantages over the practice prevailing heretofore, in that such new process does not require any preliminary heating to red heat, of the castings to be welded together, nor any subsequent heating of the blank or work to incandescence in a charcoal fire followed by slow cooling.

As an example of a welding powder suitable for the purposes of my invention, I will give the following: 30% potassium carbonate ($K_2CO_3$), 30% calcined soda ($Na_2CO_3$), 25% kitchen salt (NaCL), 14.1% borax ($Na_2B_2O_7$), 0.9% iron suboxide (FeO).

Various modifications may be made without departing from the nature of my invention as set forth in the appended claims.

I claim:

1. A flux for use in autogenous welding of cast iron, containing substantially 30% potassium carbonate, 30% calcined soda, 25% sodium chloride, 14.1% borax, and 0.9% iron suboxide.

2. A flux for use in autogenous welding of cast iron, consisting of a welding powder containing a small percentage of iron suboxide.

In testimony whereof I have signed this specification.

FRIEDRICH POLITZ.